United States Patent [19]
Macdonald

[11] Patent Number: 5,209,330
[45] Date of Patent: May 11, 1993

[54] SLIPPING BYPASS CLUTCH FOR HYDROKINETIC TORQUE CONVERTER

[75] Inventor: Fraser J. Macdonald, Farmington Hills, Mich.

[73] Assignee: Ford Motor Company, Dearborn, Mich.

[21] Appl. No.: 812,092

[22] Filed: Dec. 23, 1991

[51] Int. Cl.[5] ............................................. F16H 45/02
[52] U.S. Cl. ................................. 192/3.29; 192/70.14; 192/70.17; 192/106.2; 464/67
[58] Field of Search ...................... 192/3.28, 3.29, 3.3, 192/70.14, 70.17, 106.2, 107 R; 464/66, 67

[56] References Cited

U.S. PATENT DOCUMENTS

| | | | |
|---|---|---|---|
| 2,793,726 | 5/1957 | Jandasek | 192/3.29 |
| 3,541,893 | 11/1970 | Dyke et al. | 192/3.3 X |
| 4,437,551 | 3/1984 | Gimmler et al. | 192/3.28 |
| 4,969,543 | 11/1990 | Macdonald | 192/3.29 |
| 4,995,500 | 2/1991 | Payvar | 192/107 R |

FOREIGN PATENT DOCUMENTS

| | | | |
|---|---|---|---|
| 57-54767 | 4/1982 | Japan | 192/3.29 |
| 62-147165 | 7/1987 | Japan | 192/3.3 |

*Primary Examiner*—Richard M. Lorence
*Attorney, Agent, or Firm*—Frank G. McKenzie; Roger L. May

[57] ABSTRACT

A hydrokinetic torque converter includes an impeller housing and a bypass clutch located within the impeller housing. The impeller cover has welded to it a clutch plate, which is connected by a splined connection to a clutch piston rotatably supported on a turbine rotor. A drive ring carries friction surfaces adjacent the clutch piston and clutch plate. The drive ring extends axially into engagement with a helical spring carried in a damper assembly arranged in series with the damper between the impeller cover and the input shaft of the transmission.

10 Claims, 4 Drawing Sheets

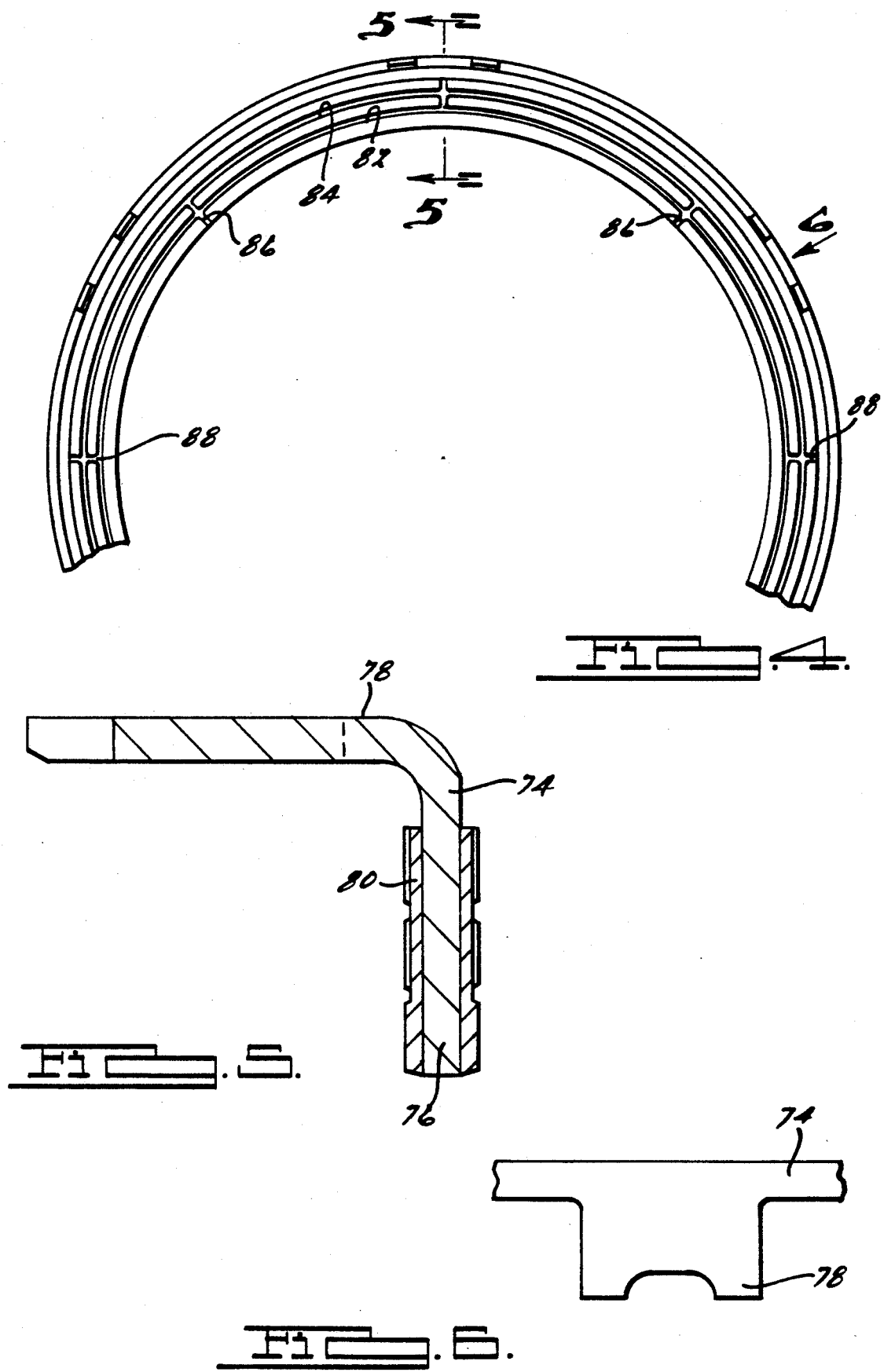

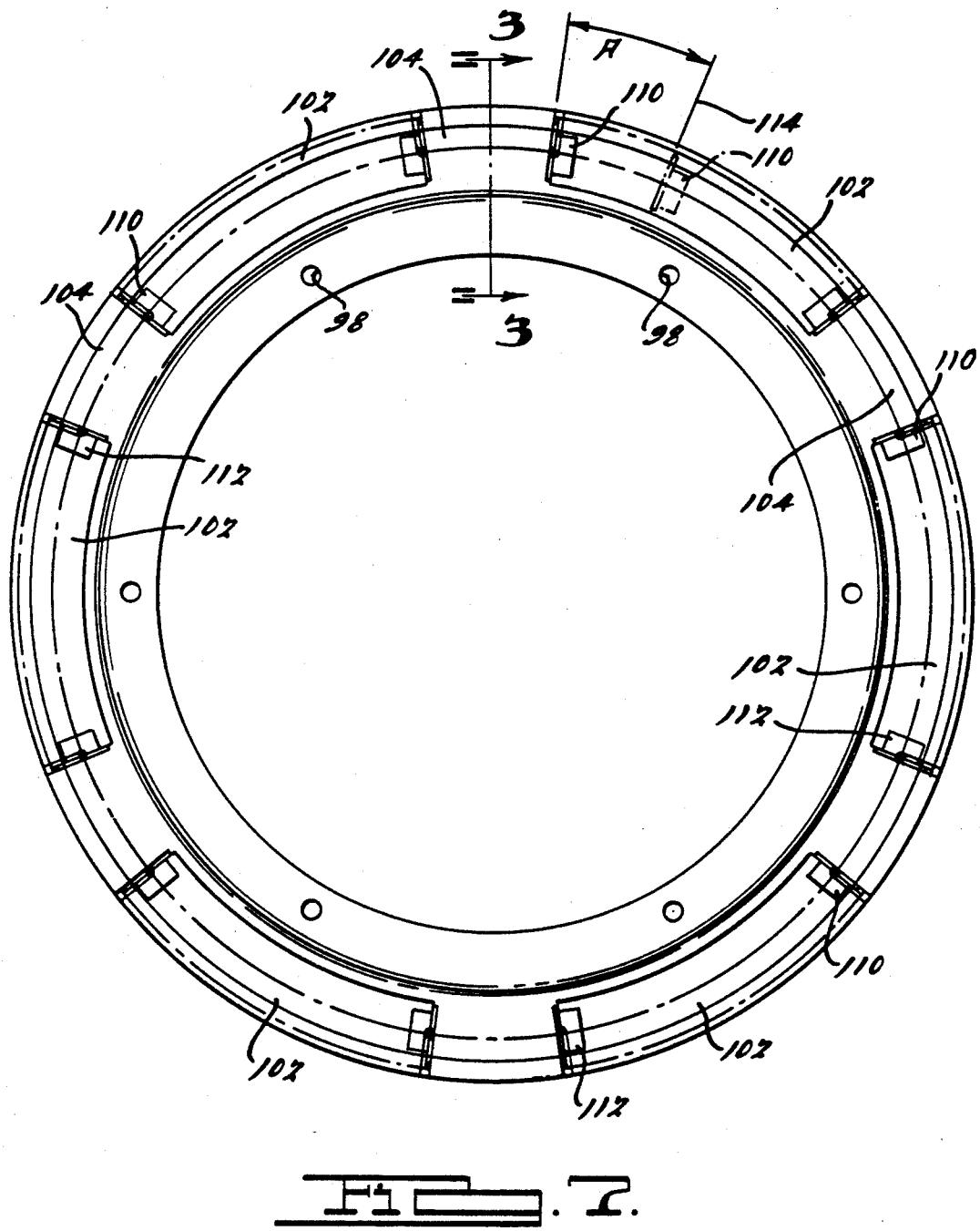

SLIPPING BYPASS CLUTCH FOR HYDROKINETIC TORQUE CONVERTER

BACKGROUND OF THE INVENTION

1. Field of the Invention

This invention relates to the field of automatic transmission torque converters, which hydrodynamically connect an impeller wheel to a turbine wheel The invention pertains particularly to a bypass clutch, which mechanically connects the turbine and impeller, bypassing the hydrokinetic connection between them, and releases the turbine and impeller, thereby reestablishing the hydrokinetic effect.

2. Description of the Prior Art

The transaxle described in U.S. Pat. No. 4,509,389, which is assigned to the assignee of my invention, includes a hydrokinetic torque converter having an impeller and a turbine. The housing for the impeller includes a lockup clutch assembly having a clutch plate that engages a friction surface on the impeller housing. The clutch plate carries friction material that establishes a frictional driving connection between the impeller and the turbine when the pressure differential across the clutch plate is sufficient to establish a clutch-engaging force.

The clutch plate is connected through a damper assembly to the hub of the turbine, thus establishing a mechanical torque transfer between an engine crankshaft and the turbine shaft, which bypasses the hydrokinetic torque flow path through the torque converter.

Converter lockup clutch constructions are well known in the art, an early prior art teaching being described in U.S. Pat. No. 3,252,352, which is assigned to the assignee of this invention. Another example of early prior art torque converter assemblies having a lockup clutch is disclosed in U.S. Pat. No. 3,541,893.

More recent prior art teachings include means for controlling the application of the torque converter clutch by means of an electronic controller that establishes a modification of the clutch engaging force under certain operating conditions, for example, during shifts when it is desired to eliminate undesired torque fluctuations and engine speed changes during transient periods when torque flow interruption is desired. The electronic controller establishes a pressure force on the clutch plate that is adequate to meet the transient torque transmission requirements of the driveline. Examples of this are shown in U.S. Pat. Nos. 4,560,043 and 4,301,900.

U.S. Pat. No. 3,541,893, which also is assigned to the assignee of this invention, includes a clutch capacity modulator valve that establishes a desired pressure in the clutch pressure control chamber defined by the impeller housing and the clutch plate. The controls for establishing the clutch capacity is intended to eliminate excess torque capacity so that the clutch will be maintained in the engaged condition under driving conditions when clutch engagement is desired, but excess clutch capacity is avoided by controlling the pressure differential across the clutch plate. This contributes to more precise lockup clutch control and eliminates undesired torque fluctuations upon clutch application and release.

It is also known in the prior art to effect a continuous slipping of a lockup clutch or bypass clutch for a hydrokinetic torque converter by continuously modulating the pressure that controls the clutch. An example of a continuously slipping bypass clutch, actuated by the pressure in the torus circuit of the converter, is disclosed in U.S. Pat. No. 4,468,988. Another example is disclosed in U.S. Pat. No. 4,662,488.

U.S. Pat. No. 4,926,988 describes a hydrodynamic clutch having a first disc, located between a piston and a second disc, carried on an impeller wheel. The piston is rotatably supported on, and driveably connected to the impeller.

U.S. Pat. No. 5,056,631 describes a torque converter clutch having a hydraulically actuated piston that carries friction material and a clutch disc. Flow passages are formed in the friction material to permit fluid flow to carry heat from the friction surface and clutch plate.

SUMMARY OF THE INVENTION

In the clutch assembly according to this invention, a drive ring having a friction disc is located between a piston and an impeller casing. The friction disc is connected to a turbine wheel; the piston is connected to the casing. The piston is supported slidably on a hub, which is fixed to the turbine wheel and is provided with a surface that limits piston movement toward the turbine.

A clutch plate, welded to the inner surface of the impeller casing, has a spline surface at its inner periphery, by which the piston is driveably connected to the casing and clutch plate.

The drive ring carries friction material having interconnected annular and radial channels that carry hydraulic fluid across the clutch when the piston and clutch plate are forced into frictional driving contact with the friction material on the drive ring.

The clutch may include one or more friction surfaces engaged by differential pressure across the piston, and may include multiple friction discs carried on the drive ring. In this way, the torque capacity of the clutch can be adjusted easily to match engine torque.

Annular pockets of circular cross section formed by complementary arcuate flanges on the support plate contain the damper springs and hold those springs in correct position against the effect of forces tending to urge the springs radially outward as the springs are compressed. Due to the modular form inherent in the design, the number of damper springs can vary with kinematic requirements without changing the principle of operation. The damper springs are located at the radially outermost location within the torque converter casing, thereby minimizing the damper-spring force needed to attenuate torsional vibration. Because the spring pockets closely conform to the outer surface of the coiled springs, as the springs compress they move in contact on the inner surface of the pockets, which are hardened by heat treatment to withstand wear due to this. The resulting frictional contact produces coulomb damping in parallel with the spring force between the drive ring and the turbine wheel. When the clutch is engaged, the drive ring is driveably connected to the impeller casing and engine; therefore, the parallel arrangement of dampers and springs is active between the engine and turbine wheel.

Conventional prior art torque converter clutch dampers are mounted on the clutch piston, and torque is applied to the damper from tangs carried on the turbine. In the prior art, the drive plate that carries torque to the damper is driven radially. In the clutch/damper assembly of this invention, the damper is mounted on the turbine wheel, and the drive ring that carries torque to the damper is driven angularly, is permitted to move axially as the bypass clutch, and is engaged by differential pressure across the clutch piston. A support plate pilots movement of the drive ring and limits its angular movement, the range of compressive displacement of the damper springs, by providing stop surfaces at several angularly spaced locations.

BRIEF DESCRIPTION OF THE DRAWINGS

FIG. 4 is an axial view of the drive ring showing details of the friction surface.

FIG. 5 is a side view of the drive ring.

FIG. 6 is a top view of a detail in the drive ring.

FIG. 7 is an axial view of the retainer and damper springs.

DESCRIPTION OF THE PREFERRED EMBODIMENT

Figure 1:
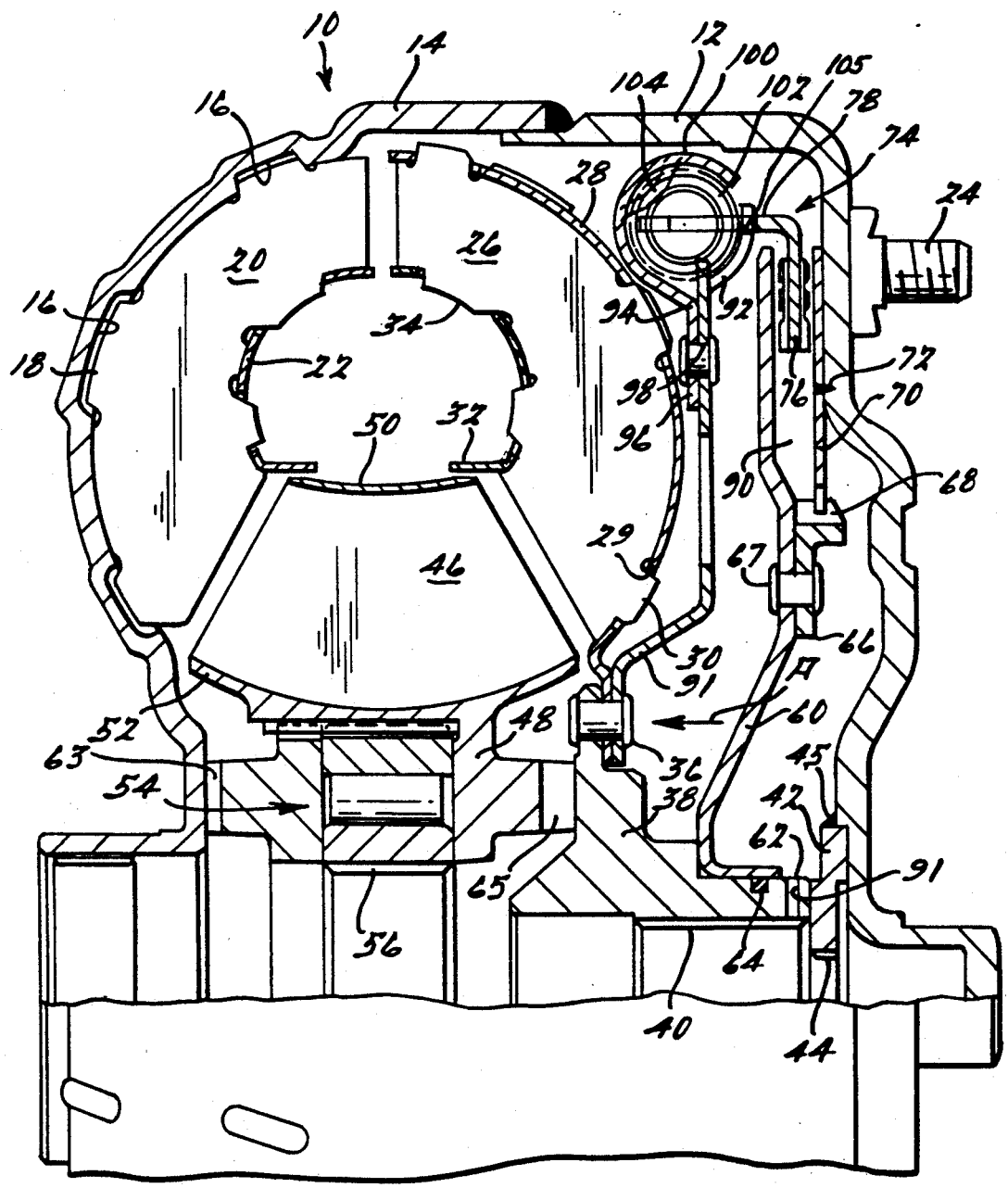
FIG. 1 is a side view of a torque converter, partially in cross section, showing a bypass clutch and damper according to the invention.

Referring first to FIG. 1, a torque converter 10 includes an impeller cover 12, which is welded to an impeller shell 14 having recesses 16, which receive tabs 18 located on the outer surface of impeller blades 20. The impeller blades are retained between shell 14 and an inner impeller shroud 22.

Impeller cover 12 supports a circular pattern of threaded studs 24 to which a flywheel, rotatably supported on the engine crankshaft, is bolted, thereby driveably connect the cover to an engine.

Turbine blades 26 are spaced mutually about the axis of rotation and are located with respect to the impeller blades so that a toroidal fluid flow within the torque converter exits the impeller and enters the turbine at the radially outer area and leaves the turbine at the radially inner area. The outer periphery of the turbine blades is fixed mechanically or by welding or brazing to a turbine shell 28, which has openings 29 that receive tabs 30 formed on the turbine blades. The inner periphery of the turbine blades is connected to an inner turbine shroud 32 by locating tabs 34 within slots formed in shroud 32 and bending the tabs over on the inner surface of the shroud, thereby fixing the position of blades 26 between shell 28 and shroud 32. Turbine shell 28 is secured by rivets 36 to a turbine hub 38 having an internally splined surface 40 adapted to engage an externally splined surface on a transmission input shaft. Disc 42, welded at 45 to the impeller casing, includes a splined surface 44.

Located between the flow exit section of the turbine and the flow entrance section of the impeller is a stator assembly comprising stator blades 46, spaced mutually around the axis of rotation, a hub 48 supporting blades 46, an inner shroud 50 connecting the radially inner tips of the blades, and an outer shroud 52 connecting the radially inner ends of the stator blades. An overrunning brake 54, fixed by splines 56 to a stationary sleeve shaft, provides one-way braking between the stator blades and the sleeve shaft.

A bypass clutch includes a piston assembly, which includes a piston 60, slideably mounted in an axially directed surface 62 formed on turbine hub 38 and sealed against the passage of hydraulic fluid by an O-ring 64, located in a recess formed in surface 62. Axial movement of piston 60 is limited by a shoulder formed on turbine hub 38, as FIG. 1 shows. A clutch plate 20 driveably connects cover 12 to the rotor of a hydraulic pump, the pressure source from which the torque converter and an automatic transmission are pressurized, controlled and actuated. The torque converter is supplied with fluid through passage 63; fluid returns to sump from the torque converter through passage 65.

A ring 66, riveted at 67 to the piston, carries a splined surface 68 that is engaged by the splines formed on the radially inner surface of clutch plate 70. The clutch plate is fixed to the inner surface of cover 12 by a spot weld 72, which provides a seal against the passage of hydraulic fluid between the axially outer surface of disc 64 and the adjacent inner surface of the cover. Therefore, clutch plate 70 and piston 60 are driveably connected through cover 12 to the engine.

Drive ring 74 includes a radial leg 76 (shown in FIG. 5) located between the inner face of clutch plate 70 and the outer face of piston 60, and six axial legs 78 (shown in FIG. 6), spaced mutually angularly about the axis of rotation and directed from leg 76 toward the turbine wheel. The surfaces of leg 76 that face plate 70 and piston 60 carry friction material 80, commonly referred to as "paper face" material, which is bonded to axially opposite radial surfaces of drive ring 74 by a bonding technique described by Frosbie, Milek and Smith in *SAE Design Practices*, Volume 5, (1962). The friction material may be bonded to the surfaces of piston 60 and clutch plate that face leg 76 of the drive ring.

As seen in FIGS. 4 and 5, the friction material 80 has formed two concentric annular grooves, 82, 84, which can be machined by turning or formed by pressing a die on the face of the plate during formation of the disc as the friction material is pressure bonded to the steel drive ring 74. The friction material 80 is formed also with two sets of radial grooves 86, 88, members of each radial groove set spaced at 90° intervals from other members of the set and at 45° intervals from members of the other set. Radial grooves 86 do not communicate with the radially outer region but they do communicate with the radially inner region of the drive ring. They also interconnect each of the annular grooves. Radial grooves 88, which communicate with the radially outer region, do not communicate with the radially inner region.

Fluid in the torus cavity of the torque converter has a pressure that is higher than pressure in chamber 90, located between friction plate 70 and piston 60. Therefore, hydraulic fluid tends to flow radially inward through grooves 88 where it is transferred to the circumferential or annular grooves. The fluid then travels circumferentially to the adjacent radial grooves 86, from which the fluid is transferred to the radially inward region of the pressure chamber 90.

Fluid circulates continuously across the friction surfaces during operation of the clutch as the clutch slips, and fluid is transferred circumferentially through the grooves thereby creating the maximum cooling effect. Heat is dissipated to the fluid and carried to chamber 90 in the control system, where it is transferred to a cooler and then recirculated to the inlet side of a pump, which pressurized the entire hydraulic system of the transmission. The pump supplies pressure to the control system, which establishes regulated pressure levels in the torus circuit of the torque converter and in chamber 90.

Because the friction material does not engage directly with cover 12, transfer of heat generated during slipping of the clutch, the speed difference between that of drive ring 74 and that of the engine crankshaft, is minimized.

Figure 2:
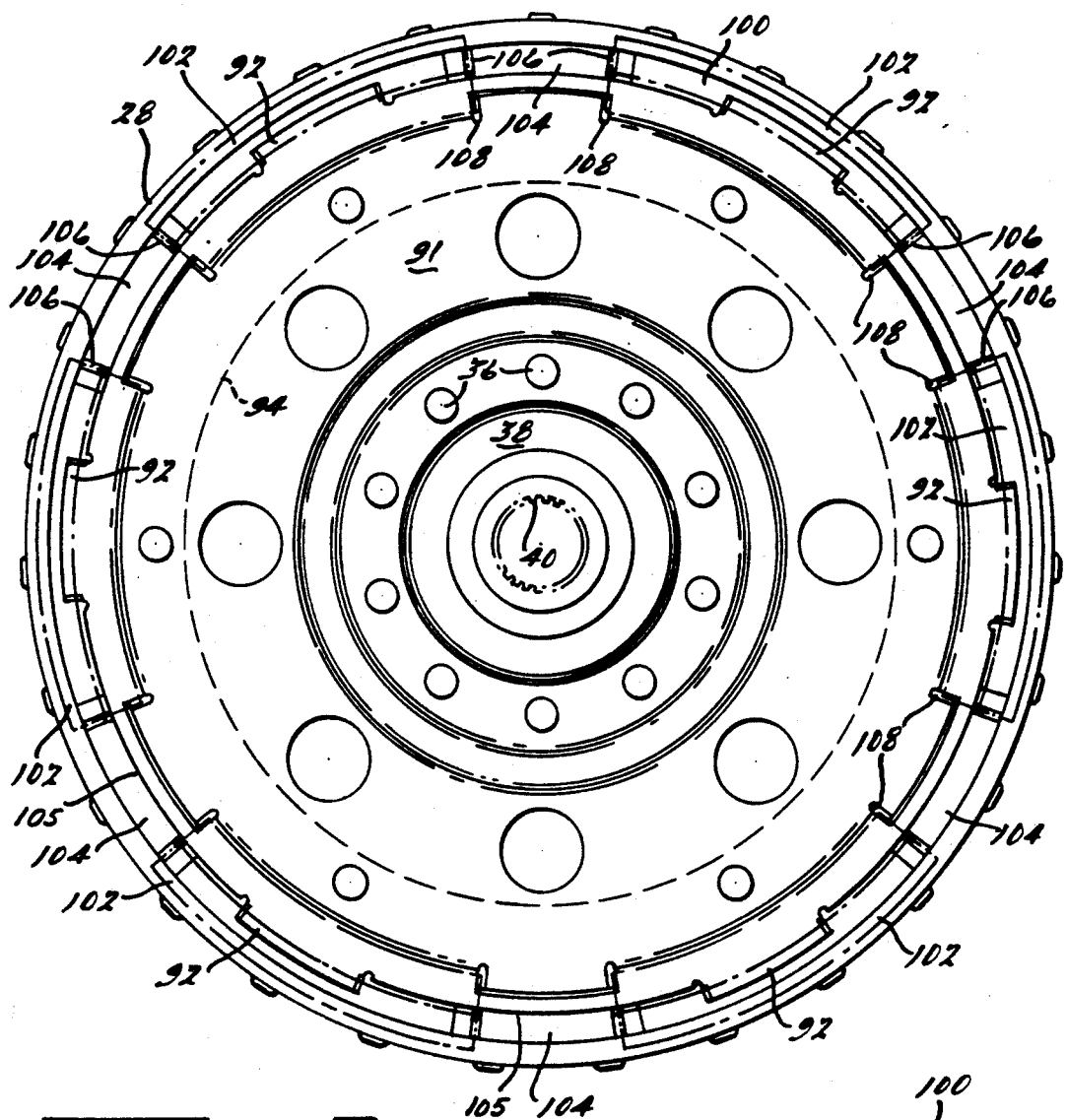
FIG. 2 is an end view taken in direction A of a damper assembly shown in FIG. 1.
Figure 3:
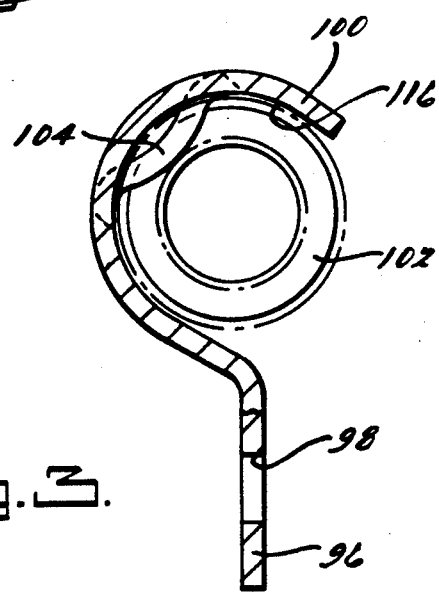
FIG. 3 is a cross section taken at plane 3—3 of FIG. 7 showing a detail of the spring retainer within the damper assembly.

Referring now to FIGS. 1 and 2, the turbine shroud 28 and a torque converter damper support 91 are joined to a radially extending flange of turbine hub 38 at a riveted connection 36. At the radially outer end of support 91, several arcuate flanges 92, spaced angularly about the axis at 60° intervals, are formed. A spring retainer ring 94 includes a radially inwardly extending web 96, riveted to support plate 91 at angularly spaced locations 98, and an arcuate flange 100 substantially complimentary to flange 92 of the support plate. Flanges 92 and 100 define between them a substantially circular tubular cavity, in which are located six angularly spaced, helically-coiled damper springs 102. At six equally spaced angular locations spaced mutually about the axis of rotation, flange 100 of the retainer ring is formed with a local bead extending approximately 16.4 degrees between radially directed relief recesses 106 that permit formation of bead 104 in the arcuate flange 100. Similar relief slots 108, formed in the support 91, permit arcuate flanges 92 to extend outwardly from the planar radially directed web of the support ring and the radially outer end of support plate 91 to extend into the spring pockets over the same intervals and lengths as the local beads 104.

Drive ring 74 is supported on several arcuate surfaces 105 that coincide with the angularly spaced beads 104 and the radial ends of the support plate. Surfaces 105 guide the drive ring as it moves axially toward clutch plate 70 due to contact with the piston 60 and away from the clutch plate as pressure within control chamber 90 falls in relation to pressure on the axially opposite side of the piston. Contact between the arcuate flanges 92 and the drive ring limits the extent to which the spings are compressed. Contact between the beads and radial ends of the support plate limit the extent to which the springs can expand.

Referring now to FIG. 7 the damper assembly includes six angularly-spaced, helically-coiled damper springs 102, the coil of each spring being closed at each end by a plug 110. Each damper spring is located between a bead 104 of the arcuate flange 100 formed on retainer 94 and a radial end of support plate 91. The damper springs move from the fully extended position shown in FIG. 7 to a fully stroked position shown in the upper right-hand quadrant of FIG. 7 at 114. When the damper springs are compressed, the radially outer surface of the spring coils move in frictional contact on the inner surface 116 of the arcuate flange 100 of the retainer. Beads 104 and the radial ends of support plate 91 limit movement of compression damper springs 102. The springs may be arcuate as formed or straight and then bent to conform to the annular spring pockets.

Each of the six axially directed legs 78 of the drive ring 74 is located within the space between angularly opposite ends of each of the damper springs. Engine torque is transmitted through drive ring 74 to the damper assembly by bearing contact between axial flanges 78 and the adjacent ends of the damper spring.

Chamber 90, defined by piston 60, cover 12, clutch plate 70 and the friction material on drive ring 74, is a control pressure chamber, which communicates with the control pressure source in a matter described in U.S. Pat. No. 4,633,738, which is assigned to the assignor of this invention. Fluid at control pressure magnitudes is supplied to chamber 90 through passage 91. By controlling pressure in chamber 90, a pressure differential across piston 60 can be controlled. The pressure in the torus flow cavity on the left-hand side of piston 60 causes the friction surfaces on clutch plate 70 and piston 60 to become frictionally engaged with the friction material 80 on the inner and outer axial surfaces of radially extending leg 76 of drive ring 74. By appropriately modulating the pressure in chamber 90, controlled slipping will occur between the drive ring and the cover and piston, whereby torque fluctuation developed in the driveline due to engine torque perturbations and other torque transmitting irregularities can be absorbed.

When pressure in chamber 90 is less than pressure in the torus cavity, piston 60 is forced rightward against the drive, and the drive ring is carried rightward into contact with clutch plate 70. The cover, clutch plate and piston turn at the speed of the engine. The drive ring is connected through the damper assembly resiliently through the damper springs to support 91, and via the attachment at rivets 36 to the torus rotor, and through hub 38 to the transmission input shaft.

Having described a preferred embodiment of my invention, what I claim the desire to secure by U.S. letters patent is:

1. In an hydrokinetic torque converter that includes a casing, an impeller driveably connected to the casing and a turbine located between the casing and the impeller, a clutch for driveably releasing and locking the impeller and turbine, comprising:

a piston slidably mounted on the turbine, sealed on the turbine against passage of fluid, and having a first friction surface located at a radially outer portion of the piston;

means for nonreleasably connecting the piston and casing and for permitting axial displacement of the piston relative to the casing;

a second friction surface carried on the casing, facing the first friction surface;

a drive ring supported on the turbine for axial sliding movement relative to the turbine having a friction disc located between the first friction surface and second friction surface; and passage means for alternatively pressurizing and venting a first space located between the casing and the piston and a second space located between the piston and the turbine.

2. The clutch of claim 1 wherein the connecting means comprises:

a clutch disc fixed to the casing, having a second friction surface located at a radially outer portion, and a first spline surface located at a radially inner portion; and a ring fixed to the piston, having a second spline surface in meshing engagement with the first spline surface.

3. The clutch of claim 1 further comprising a stop on the turbine wheel for limiting movement of the piston relative to the casing.

4. The clutch of claim 2 further comprising a stop on the turbine wheel for limiting movement of the piston relative to the casing.

5. The clutch of claim 2 wherein the clutch disc is welded to the casing at a location between the first friction surface and the first spline surface.

6. The clutch of claim 1 wherein a surface of the group consisting of the drive ring, piston and second friction surface includes friction material bonded to said surface and extending between radially inner and outer portions thereof, said friction material having radially spaced annular groves connected by first radially directed grooves that communicate with the radially inner region of the friction material and second radially directed grooves that communicate with the radially outer region of the friction material.

7. In an hydrokinetic torque converter that includes a casing, an impeller driveably connected to the casing and a turbine located between the casing and the impeller, a clutch for driveably releasing and locking the impeller and turbine, comprising:

a piston slidably mounted on the turbine, sealed on the turbine against passage of fluid, and having a first friction surface located at a radially outer portion of the piston;

means for rotatably connecting the piston and casing and for permitting displacement of the piston relative to the casing;

a second friction surface carried on the casing, facing the first friction surface;

a drive ring supported on the turbine for axial sliding movement relative to the turbine and casing having a friction disc located between the first friction surface and second friction surface; and passage means for alternately pressurizing and venting a first space located between the casing and the piston and a second space located between the piston and the turbine; and damper means located in a torque path between the turbine and drive ring for absorbing and dissipating torsional vibrations.

8. The clutch of claim 7 wherein the connecting means comprises:

a clutch disc fixed to the casing, having a second friction surface located at a radially outer portion, and a first spline surface located at a radially inner portion; and a ring fixed to the piston, having a second spline surface in meshing engagement with the first spline surface.

9. The clutch of claim 8 wherein the clutch disc is welded to the casing at a location between the first friction surface and the first spline surface.

10. The clutch of claim 7 wherein a surface of the group consisting of the drive ring, piston and second friction surface includes friction material bonded to said surface and extending between radially inner and outer portions thereof, said friction material having radially spaced annular groves connected by first radially directed grooves that communicate with the radially inner region of the friction material and second radially directed grooves that communicate with the radially outer region of the friction material.

* * * * *